United States Patent [19]

Katayama

[11] Patent Number: 4,890,431
[45] Date of Patent: Jan. 2, 1990

[54] WINDOW MOLDING
[75] Inventor: Kenji Katayama, Anjyo, Japan
[73] Assignee: Inoue MTP Kabushiki Kaisha, Nagoya, Japan
[21] Appl. No.: 241,430
[22] Filed: Sep. 7, 1988
[30] Foreign Application Priority Data
  Jul. 31, 1987 [JP] Japan .................................. 62-118732
[51] Int. Cl.⁴ .............................................. E06B 3/62
[52] U.S. Cl. ........................................ 52/208; 52/400
[58] Field of Search ................ 52/397, 400, 402, 208
[56] References Cited
  U.S. PATENT DOCUMENTS
  4,165,119  8/1979  Hedeen et al. .................... 52/400 X
  4,259,823  4/1981  Hellriegel ............................. 52/400
  4,441,755  4/1984  Endo et al. ....................... 52/400 X
  4,458,459  7/1984  Irrgang ............................. 52/400 X
  4,478,020 10/1984  Jackson ............................ 52/397 X Primary Examiner—David A. Scherbel
Assistant Examiner—Lan Mai
Attorney, Agent, or Firm—Armstrong, Nikaido, Marmelstein, Kubovcik & Murray

[57] ABSTRACT

A window molding which is made of nonrigid plastics and which is attached to a vehicle body and a window glass, wherein the molding has contacting portions which come into contact with the vehicle body and the window glass and which are made of softer nonrigid plastics.

6 Claims, 2 Drawing Sheets

WINDOW MOLDING

BACKGROUND OF THE INVENTION

1. Field of the Invention

The present invention relates to a window molding which is applied to a periphery of a window of an automobile.

2. Description of the Related Art

Window glasses for rear and front windows of an automobile are often secured to a vehicle body in a so-called direct glazing in which the window glasses are directly adhered to edges of window openings of the vehicle body by an adhesive. FIG. 4 shows a known window glass 20 which is adhered by an adhesive 30 to a flange 11 of a panel 10 which is bent inwardly, in the direct glazing method. As can be seen in FIG. 4, there is a slight gap between the body panel 10 and the peripheral edge of the glass 20. A plastic molding is provided to cover the gap.

FIGS. 3 and 4 show two known shapes of moldings, i.e. generally J-shaped molding 40A and generally T-shaped molding 40. Note that FIG. 3 shows an arrangement of a molding according to the present invention, although the shape thereof per se is well known. Namely, the subject of the invention is not directed to the shape of the molding. The moldings 40 (FIG. 4) and 40A (FIG. 3) have outer decorative portions 41 and 41A which bridge the glass 20 and the body panel 10 to come into engagement therewith, and leg portions 42 and 42A which are inserted into the gap. Usually, the outer decorative portion 41 and 41A have arcuate end edges 43 and 43A adjacent to the vehicle body, so that the arcuate end edges 43 and 43A can be elastically attached onto the vehicle body. The leg portions 42 and 42A are provided, on their one side or opposite sides, with abutments or fins 44 and 44A to keep the postures of the moldings 40 and 40A. The moldings 40 and 40A are made of nonrigid plastics, such as nonrigid polyvinyl chloride or the like to have a flexibility or an elasticity as a whole due to the presence of the arcuate end edges 43 and 43A and the abutments 44 and 44A.

When an automobile travels on a road, the automobile continuously vibrates due to an uneven surface of the road, so that the vehicle body continuously and repeatedly produces a slight strain. On other hand, since the glass and the molding are adhered to the vehicle body by the adhesive, the occurrence of the strain of the glass and the molding is not synchronous with that of the vehicle body. Namely there is a difference in occurrence of the strain between the vehicle body and the molding and between the molding and the glass. The difference is continuously caused during the travel of the automobile. This results in an occurrence of a friction noise which causes a driver or a passenger to feel uncomfortable The inventor of the present invention has found that a decrease of the frictional resistance between the vehicle body and the molding(s) etc. decreases the friction noise.

The primary object of the present invention is therefore to provide a window molding which can decrease the friction noise.

SUMMARY OF THE INVENTION

To achieve the object mentioned above, according to the present invention, there is provided a predetermined shape of window molding which is made of nonrigid plastics in which a lubricant is immersed at the portions of the molding that come into contact with a vehicle body and/or a window glass to which the molding is to be attached.

The lubricant can be for example paraffine or the like.

The nonrigid plastics containing a predetermined amount of lubricant immersed therein is co-extruded together with the nonrigid plastics of which the remaining portion of the molding is made, upon extruding to form the contacting portion with the vehicle body and/or the window glass. Namely, the contacting portion of the molding contains a large amount of lubricant, such as paraffine. The lubricant is partially exposed onto the outer surface of the contacting portion of the molding due to kneading upon extruding molding. As a result, if a relative slide takes place between the vehicle body and the molding due to the strain or vibration etc., the lubricant on the contacting portion of the molding reduces the frictional resistance therebetween, thus resulting in a smooth relative sliding movement. Since the lubricant (paraffine) which is kneaded with nonrigid plastics is not chemically bound to the nonrigid plastics, the lubricant bleeds onto the outer surface of the molding for a long period of time, which is called a "bleed phenomenon", so that a possible wear of the lubricant layer of the molding due to the relative slide mentioned above can be compensated by the lubricant which is continuously bled. As a result, the frictional resistance between the vehicle body and the molding can be minimized, resulting in the prevention of the occurrence of the friction noise.

BRIEF DESCRIPTION OF THE DRAWINGS

The invention will be explained below in detail with reference to the accompanying drawings, in which.

DESCRIPTION OF EMBODIMENTS

Figure 1:
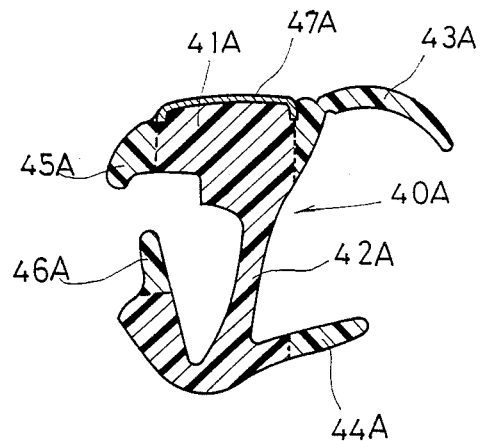
FIG. 1 is a sectional view of a molding according to one aspect of the present invention.
Figure 2:
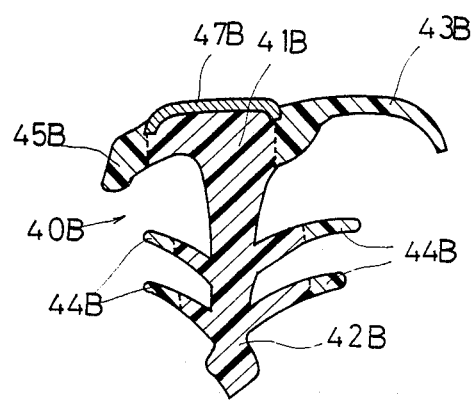
FIG. 2 is a sectional view of a molding according to another aspect of the present invention.

In FIGS. 1 and 2 which show sectional views of different moldings 40A (generally J-shape) and 40B (generally T-shape) according to different embodiments of the present invention. The shapes of the moldings according to the embodiments of the present invention are substantially same as those of the prior art.

Figure 3:
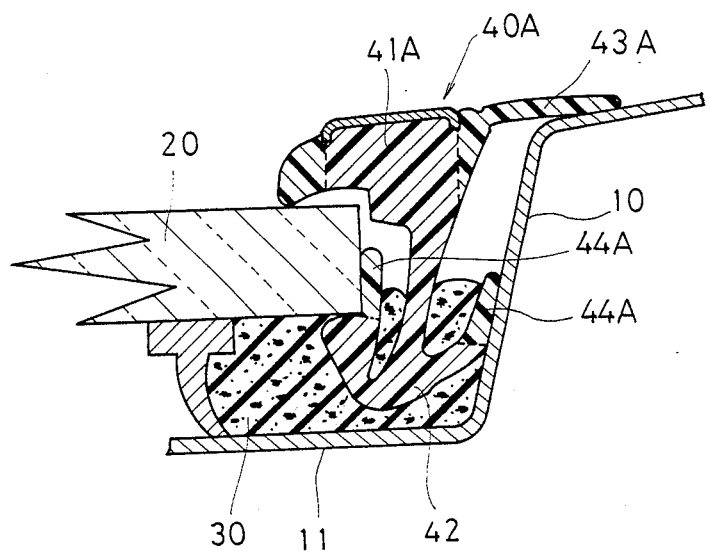
FIG. 3 is a sectional view of a molding shown in FIG. 1, attached to a window opening of an automobile; and, FIG. 4 is a sectional view of a known molding attached to a window opening.
Figure 4:
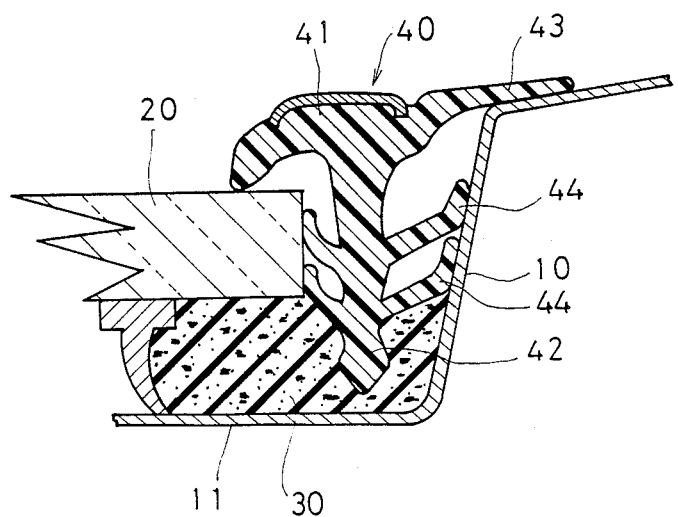

The moldings 40A and 40B have outer decorative portions 41A and 41B and leg portions 42A and 42B. The outer decorative portions 41A and 41B have outwardly convex (arcuate) profiles and are provided on their opposite outer ends with elastically deformable abutments 43A, 45A and 43B, 45B, which are outwardly slightly curved, respectively to come into elastic contact with the glass 20 and the vehicle body 10, as shown in FIG. 3. The leg portions 42A and 42B extend downward from the lower surfaces of the outer decorative portions 41A and 41B. Preferably, each of the leg portions 42A, 42B is provided on its one side or on its opposite sides with fines 44A and 44B which can be elastically pressed against the peripheral surface of the glass 20 and the outer surface of the vehicle body 10. FIG. 3 shows an arrangement of the molding 40A of FIG. 1, attached to the vehicle body 10 and the glass 20. The arrangement of the molding 40A of FIG. 2 which is attached to the glass 20 and the vehicle body 10 is substantially same as that of FIG. 4 and accordingly is not shown in the drawings.

The moldings 40A and 40B are made of nonrigid plastic material, such as nonrigid polyvinyl chloride or the like. The portions 43A and 43B, 44A and 44B, 45B and 45B, and 46A and 46B of the moldings 40A and 40B that come into contact with the glass or the vehicle body are made of a softer material than the material of the remaining portions of the moldings. Namely, the projections 45A and 45B (contacting portions) of the outer decorative portions 41A and 41B which come into contact with the glass, the fin-shaped portions 43A and 43B (contacting portions) which extend from the outer decorative portions 41A and 41B to come into contact with the vehicle body, and the front halves of the fin-shaped portions 44A and 44B which project from the leg portions 42A and 42B are made of nonrigid polyvinyl chloride having the Shore A hardness of about 74 degrees and the remaining portions (outer decorative portions 41A and 41B and the leg portions 42A and 42B) of the moldings are made of nonrigid plastics having the Shore A hardness of about 90 degrees. A lubricant, such as paraffine is kneaded into the material of the contacting portions 43A and 43B, 44A and 44B, 45A and 45B, and 46A and 46B. As the lubricant can be used wax, high fatty acid, high alcohol, silicon or its derivative, in place of paraffine. Preferably, the amount of lubricant to be contained is more than 2 % in weight to periodically bleed the lubricant. The lubricant ensures a good lubricating contact of the contacting portions with the glass 20 and the vehicle body 10. The moldings 40A and 40B can be produced by extruding materials with and without the lubricant together, so that the molded products have portions which are made of materials containing the lubricant and without the lubricant, respectively. Note that numeral 47 designates a bright foil applied to the outer decorative portions 41A and 41B to improve the appearance of the vehicle body.

As can be understood from the foregoing, according to the present invention, since the portions of the molding which come into contact with the window glass and the vehicle body are made of nonrigid plastics containing a lubricant, such as paraffine, the occurrence of the noise due to the relative slide contact which repeatedly occurs between the molding and the window glass and/or the vehicle body due to the vibration of the vehicle body etc. can be almost prevented. The effect of the prevention of the occurrence of noise can be maintained for a long period of time because of the periodical bleeding of the lubricant.

I claim:

1. A window molding of nonrigid plastics and attached to a vehicle body and/or a window glass, wherein said molding has contract portions which come into with the vehicle body and/or window glass and which are made of softer nonrigid plastics, said softer nonrigid plastics of which said contact portions are made contains a lubricant.

2. A window molding according to claim 1, wherein said lubricant is paraffine.

3. A window molding according to claim 1, wherein said nonrigid plastics have about 90 degrees of Shore A hardness.

4. A window molding according to claims 1, wherein said softer nonrigid plastics have about 74 degrees of Shore A hardness.

5. A window molding according to claim 2, wherein said lubricant is selected from the group of lubricants comprising waxes, high fatty acids, high alcohols, silicons and silicone derivatives.

6. A window molding according to claim 5, wherein said lubricant content is more than 2 %, by weight, of said nonrigid plastic.

* * * * *